(12) United States Patent
Kato et al.

(10) Patent No.: US 11,878,731 B2
(45) Date of Patent: Jan. 23, 2024

(54) SWITCH DEVICE

(71) Applicants: KABUSHIKI KAISHA TOKAI RIKA DENKI SEISAKUSHO, Aichi (JP); TOYOTA JIDOSHA KABUSHIKI KAISHA, Toyota (JP)

(72) Inventors: Masahiro Kato, Aichi (JP); Nobuyuki Ishigure, Aichi (JP); Yuki Sato, Aichi (JP); Tadashi Usuya, Aichi (JP); Takayuki Aoki, Toyota (JP); Shinji Matsubara, Toyota (JP); Toshihiko Kosugi, Toyota (JP); Ryusuke Ohta, Toyota (JP); Shinji Hara, Aichi (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 505 days.

(21) Appl. No.: 17/189,065

(22) Filed: Mar. 1, 2021

(65) Prior Publication Data
US 2021/0276605 A1 Sep. 9, 2021

(30) Foreign Application Priority Data
Mar. 4, 2020 (JP) ................................. 2020-036774

(51) Int. Cl.
*G06F 17/00* (2019.01)
*B62D 1/04* (2006.01)

(52) U.S. Cl.
CPC ...... *B62D 1/046* (2013.01); *B60K 2370/1537* (2019.05); *B60K 2370/782* (2019.05)

(58) Field of Classification Search
CPC .. B62D 1/046; B62D 1/06; B60K 2370/1537; B60K 2370/782; H01H 13/08; H01H 13/18
(Continued)

(56) References Cited

U.S. PATENT DOCUMENTS 5,440,085 A * 8/1995 Suzuki ................. B60Q 1/1469
200/61.54
7,278,510 B1 * 10/2007 Richards ................. F16H 59/02
74/473.31
(Continued)

FOREIGN PATENT DOCUMENTS

DE 102019115375 A1 * 12/2019 ............. B60K 35/00
JP 2001176356 A 6/2001
(Continued)

OTHER PUBLICATIONS

What Are Paddle Shifters? (Year: 2021).*
Japanese Office Action issued in connection with Japanese Application No. 2020-036774 dated Mar. 8, 2022.

*Primary Examiner* — Ronnie M Mancho
(74) *Attorney, Agent, or Firm* — Tarolli, Sundheim, Covell & Tummino LLP

(57) ABSTRACT

A switch device includes a switch body, which is attached to and rotated integrally with an irregularly-shaped steering unit, and a lever unit, which is held pivotally about a switch body. The lever unit includes a lever shaft including a base, which extends in a direction intersecting the steering shaft, and an arm, which is formed integrally with the base and extends in a direction that differs from the direction in which the base extends. The lever unit also includes a lever head at the distal end of the lever shaft, and the lever head extends from the lever shaft in the width direction, which intersects an axial direction.

6 Claims, 10 Drawing Sheets

(58) Field of Classification Search
USPC .......................................................... 701/36
See application file for complete search history.

(56) References Cited

U.S. PATENT DOCUMENTS

| | | | | |
|---|---|---|---|---|
| 11,673,597 | B2* | 6/2023 | Ishigure | ................. B62D 1/046 |
| | | | | 701/36 |
| 2003/0019731 | A1* | 1/2003 | Liburdi | ................ B60Q 1/1469 |
| | | | | 200/61.54 |
| 2006/0214617 | A1* | 9/2006 | Kimura | .................... B60S 1/08 |
| | | | | 318/443 |
| 2016/0152137 | A1* | 6/2016 | Sunahiro | ................. B62D 5/04 |
| | | | | 180/364 |
| 2018/0181160 | A1* | 6/2018 | Itokawa | ................... G05G 1/04 |
| 2019/0375341 | A1 | 12/2019 | Sakai | |
| 2021/0276606 | A1* | 9/2021 | Ishigure | .............. B60Q 1/1469 |
| 2023/0130251 | A1* | 4/2023 | Funahashi | ............ B60S 1/0803 |
| | | | | 15/250.16 |

FOREIGN PATENT DOCUMENTS

| | | | |
|---|---|---|---|
| JP | 2003-118416 A | | 4/2003 |
| JP | 2013157107 A | | 8/2013 |
| JP | 2019037714 A | * | 3/2019 |
| JP | 2019-156096 A | | 9/2019 |
| JP | 2019156096 A | * | 9/2019 |
| JP | 2019-209916 A | | 12/2019 |

* cited by examiner

SWITCH DEVICE

RELATED APPLICATIONS

The present invention is a Nonprovisional Application under 35 USC 111(a), claiming priority to Serial No. JP 2020-036774, filed on 4 Mar. 2020, the entirety of which is incorporated herein by reference.

BACKGROUND

1. Field

The following description relates to a switch device arranged near an irregularly-shaped steering unit.

2. Description of Related Art

A known lever combination switch having multiple switching functionalities is used as a switch device that is operated to actuate vehicle on-board devices (refer to, for example, Japanese Laid-Open Patent Publication No. 2001-176356). Examples of switch functionalities of the lever combination switch include a turn signal switch, a light switch, a dimmer switch, a wiper switch, and a washer switch.

SUMMARY

Recent autonomous vehicles do not require to be manually operated. The driver operates a steering unit only when necessary. Thus, the steering unit does not necessarily have to be of a circular design since it will not be operated at all times. This allows the steering unit of an autonomous vehicle to be non-circular and have an irregular shape in accordance with the preference of a user.

If an irregularly-shaped steering unit is not circular, the distance to an operated switch from the irregularly-shaped steering unit will vary in accordance with the rotation angle of the irregularly-shaped steering unit. This may lead to poor operability because the switch may be difficult to find.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lever-type switch device includes multiple switching functionalities for operating multiple vehicle on-board devices. The switch device includes a switch body arranged on an irregularly-shaped steering unit and rotated to steer a vehicle, in which the switch body is attached to and rotated integrally with the irregularly-shaped steering unit, and a lever unit held pivotally about the switch body. The lever unit includes a lever shaft including a base that extends in a direction intersecting a rotary shaft of the irregularly-shaped steering unit and an arm that is formed integrally with the base and extends in a direction differing from the direction in which the base extends, and a lever head arranged on a distal end of the lever shaft, in which the lever head has a dimension that is larger than a diameter of the arm.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A switch device according to one embodiment will now be described with reference to the drawings.

Figure 1:
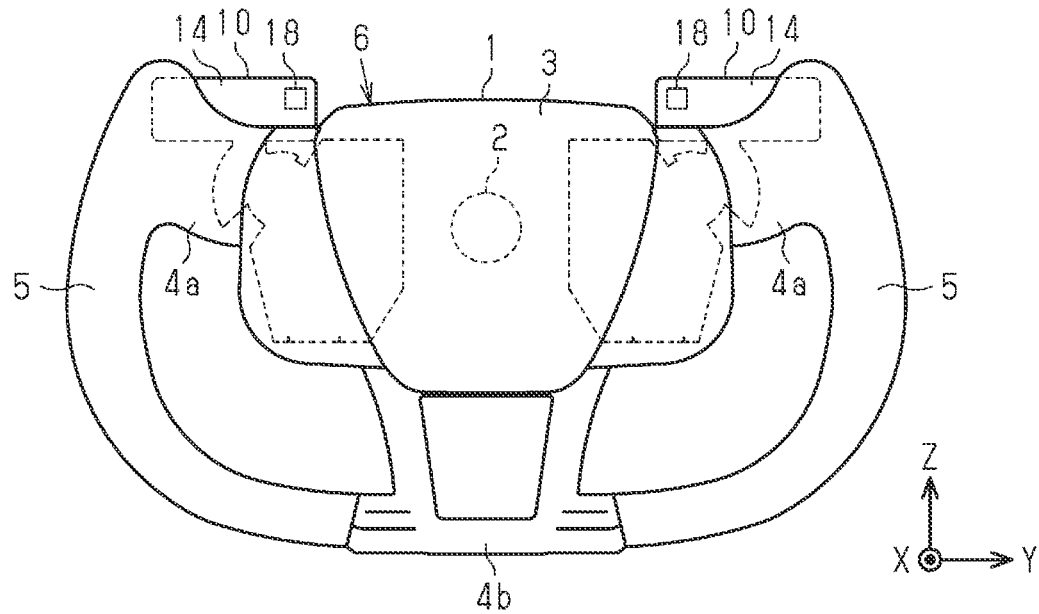
FIG. 1 is a front view showing an irregularly-shaped steering unit.

As shown in FIG. 1, an irregularly-shaped steering unit 1 that is operated to steer the vehicle is arranged near a driver seat. The irregularly-shaped steering unit 1 is rotationally coupled to the vehicle body by steering shaft 2, which is coaxial to the steering unit 1. The steering shaft 2 corresponds to a rotary shaft of the irregularly-shaped steering unit 1. In the axial direction of the steering shaft 2, the back side is opposed toward the vehicle body and the front side is opposite to the back side. The front side of the irregularly-shaped steering unit 1 is opposed toward a user who performs steering. A width direction and a height direction of irregularly-shaped steering unit 1 are orthogonal to each other and to the axial direction. In FIG. 1, the axial direction, the width direction, and the height direction are indicated as the X-axis direction, the Y-axis direction, and the Z-axis direction, respectively.

The irregularly-shaped steering unit 1 includes a hub 3 connected to the steering shaft 2 and two grips 5 arranged near the hub 3. The irregularly-shaped steering unit 1 also includes two spokes 4a, arranged at opposite sides of the hub 3 in the width direction of the irregularly-shaped steering unit 1, and a spoke 4b, arranged at the lower side of the hub 3 in the height direction of the irregularly-shaped steering unit 1. In one example, the irregularly-shaped steering unit 1 includes the two spokes 4a coupled to the two ends of the hub 3 in the width direction of the irregularly-shaped steering unit 1 and the spoke 4b coupled to the lower end of the hub 3 in the height direction of the irregularly-shaped steering unit 1. The spokes 4a and the spoke 4b connect the hub 3 and the grips 5.

The hub 3, the spokes 4a, 4b, and the two grips 5 form a peripheral portion 6 of the irregularly-shaped steering unit 1. The peripheral portion 6 defines the contour of the irregularly-shaped steering unit 1 in a front axial view. The peripheral portion 6 of the present embodiment is longer in the width direction and shorter in the height direction. In this manner, the irregularly-shaped steering unit 1 is a steering wheel having dimensions that differ in the width direction and the height direction. That is, the irregularly-shaped steering unit 1 has a shape that is noncircular shape. The irregularly-shaped steering unit 1 may be shaped to be elliptic.

The two grips 5 of the present embodiment are arranged at opposite sides of the irregularly-shaped steering unit 1 in the width direction. The two grips 5 form a non-annular shape that does not include an upper portion and a lower portion in the height direction. The grips 5 are connected by the spoke 4b to the lower side of the hub 3. The hub 3 and the spoke 4b form the lower portion of the peripheral portion 6. The upper sides of the grips 5 are connected to the hub 3 by the spokes 4a. The hub 3, the spokes 4a, and the grips 5 form the upper portion the peripheral portion 6. The grips 5 form the side portions of the peripheral portion 6 at opposite sides of the peripheral portion 6 in the width direction. In one example, a first end of each grip 5 is coupled to the corresponding one of the spokes 4a, and a second end of the grip 5 is coupled to the spoke 4b.

Two switch devices 10 that are operated to actuate vehicle on-board units are arranged proximate to the irregularly-shaped steering unit 1. The switch devices 10 are arranged in a symmetrical manner at back side of the irregularly-shaped steering unit 1. Symmetrical as referred to in the present disclosure includes not only a perfectly symmetrical state but also refers to substantially symmetrical state as long as the advantages of the present embodiment can be obtained. Each switch device 10 is used to operate multiple vehicle on-board units. Examples of the onboard device includes a turn signal device, a light device, a fog lamp device, a front wiper device, a rear wiper device, and a mist washer device. The axial direction, the width direction, and the height direction of the irregularly-shaped steering unit 1 correspond to the axial direction, the width direction, and the height direction of the switch device 10.

Figure 2:
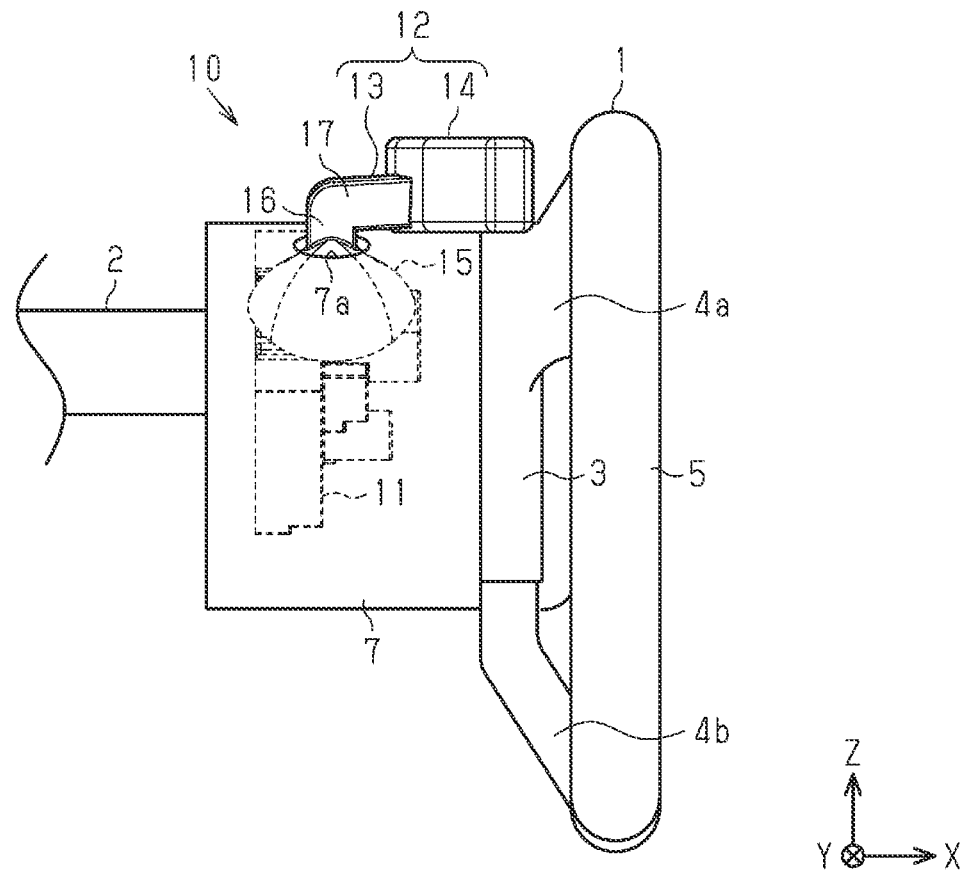
FIG. 2 is a side view showing the irregularly-shaped steering unit.

As shown in FIG. 2, the irregularly-shaped steering unit 1 includes a back cover 7 at the back side of the hub 3. The back cover 7 is, for example, hollow and surrounds the steering shaft 2. Further, the back cover 7 forms the rear shell of the irregularly-shaped steering unit 1.

Figure 3:
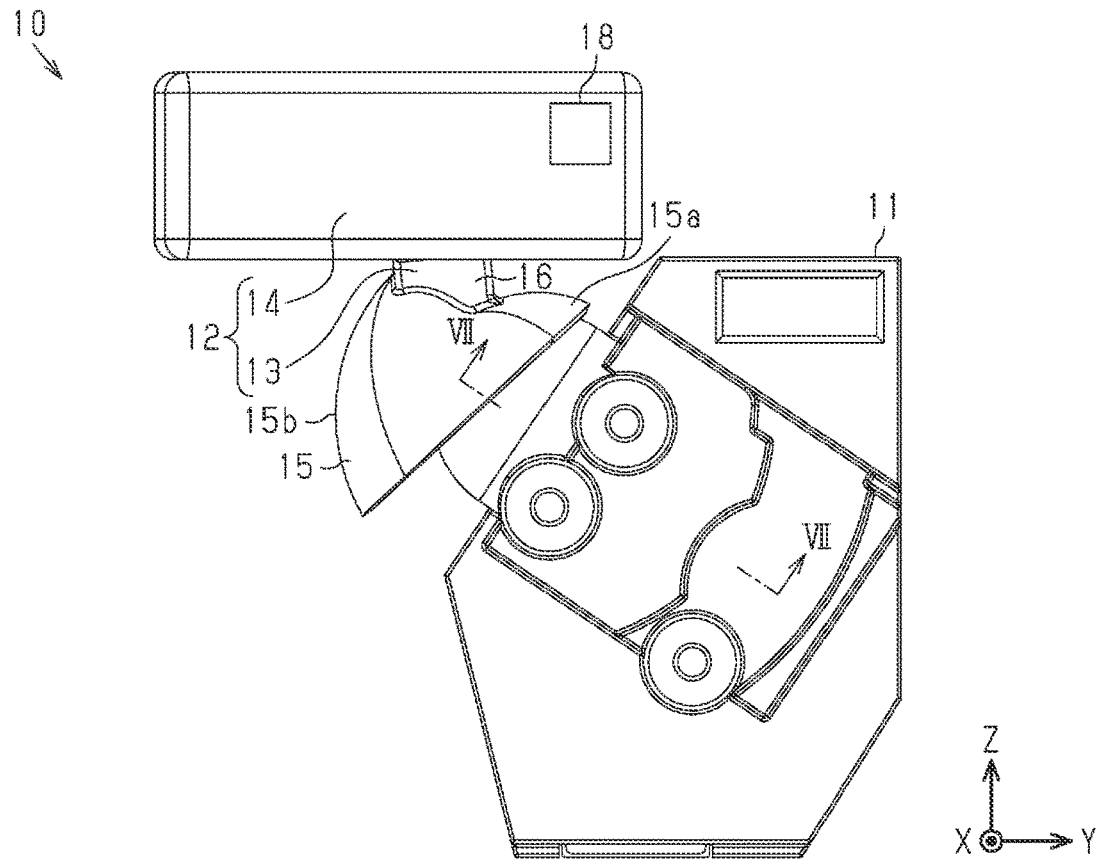
FIG. 3 is a front view showing a switch device.

As shown in FIGS. 2 and 3, the switch device 10 includes a switch body 11, which is attached to rotate integrally with the irregularly-shaped steering unit 1, and a lever unit 12, which is held pivotally about the switch body 11. The switch body 11 is accommodated in the back cover 7. The lever unit 12 projects out of an insertion hole 7a, which extends through the back cover 7, in the radial direction of the steering shaft 2. The lever unit 12 is arranged to pivot about the switch body 11 and the irregularly-shaped steering unit 1. The lever unit 12 is assigned a switching function that switches contact points.

The lever unit 12 includes a lever shaft 13 extending from the switch body 11 and a hammer-shaped lever head 14 connected to the switch body 11 by the lever shaft 13. A guard 15 is arranged in the insertion hole 7a around the lever shaft 13. Preferably, the lever unit 12 is of a momentary type that automatically returns to its initial position when released after being moved away from the initial position.

The lever shaft 13 includes a base 16, which is connected to the switch body 11 and projects upward from the switch body 11, and an arm 17, which extends in the axial direction from the base 16. Accordingly, the lever shaft 13 is bent at a position located outward from the back cover 7 in the radial direction. The guard 15 is arranged around the base 16. The arm 17 extends along the back cover 7 from the back side toward the front side of the irregularly-shaped steering unit 1. The lever head 14 is arranged at the end of the front side of the arm 17.

Figure 4:
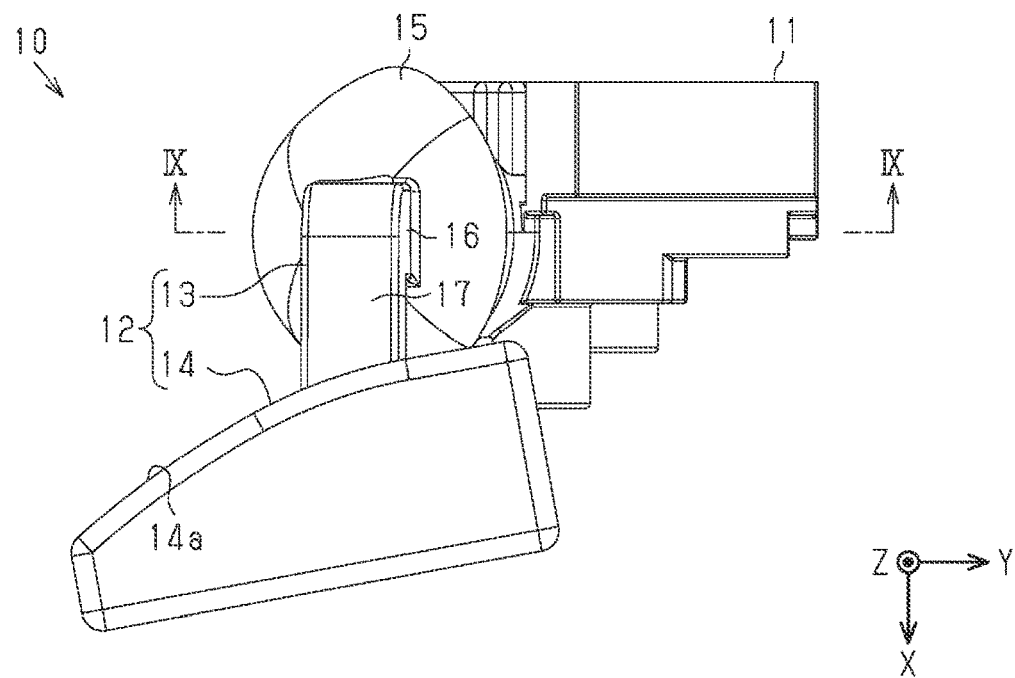
FIG. 4 is a top view showing the switch device.

As shown in FIGS. 3 and 4, the lever head 14 extends from the arm 17 of the lever shaft 13 in a direction that intersects the axial direction. In other words, the arm 17 and the lever head 14 intersect each other in a substantially T-shaped manner. The lever head 14 of the present embodiment extends from the arm 17 in the width direction of the irregularly-shaped steering unit 1. In this manner, the lever head 14 is shaped to be larger than the diameter of the arm 17. The diameter of the arm 17 is, for example, the dimension of the arm 17 in the direction that intersects the direction in which the arm 17 extends. The lever head 14 extends further in the radial direction of the steering shaft 2 than the lever shaft 13.

The lever head 14 is arranged to move away from the steering shaft 2 in the width direction of the irregularly-shaped steering unit 1, that is, incline outward in the width direction toward the front side in the axial direction. Further, the lever head 14 is arranged diagonally relative to the axial direction so that a back surface 14a of the lever head 14 is narrowed in the axial direction outward in the width direction of the lever head 14.

As shown in FIG. 1, the lever units 12 do not project out of the peripheral portion 6 of the irregularly-shaped steering unit 1 in the width direction. The lever units 12 project outward from the peripheral portion 6 in the height direction. The lever units 12 of the present embodiment project upward and outward from the upper portion of the peripheral portion 6 in the height direction. The lever units 12 are arranged downward from the upper ends of the grips 5. That is, the lever units 12 are formed so as not to extend outward from the grips 5 but are partially exposed to the front side of the irregularly-shaped steering unit 1.

As described above, the lever heads 14 are partially exposed to the front side of the irregularly-shaped steering unit 1 in the axial direction. The lever heads 14 each include a display 18 that displays a switching function on an exposed front surface. The display 18 displays, for example, an operation direction for the turn signal device or the wiper device.

Figure 5:
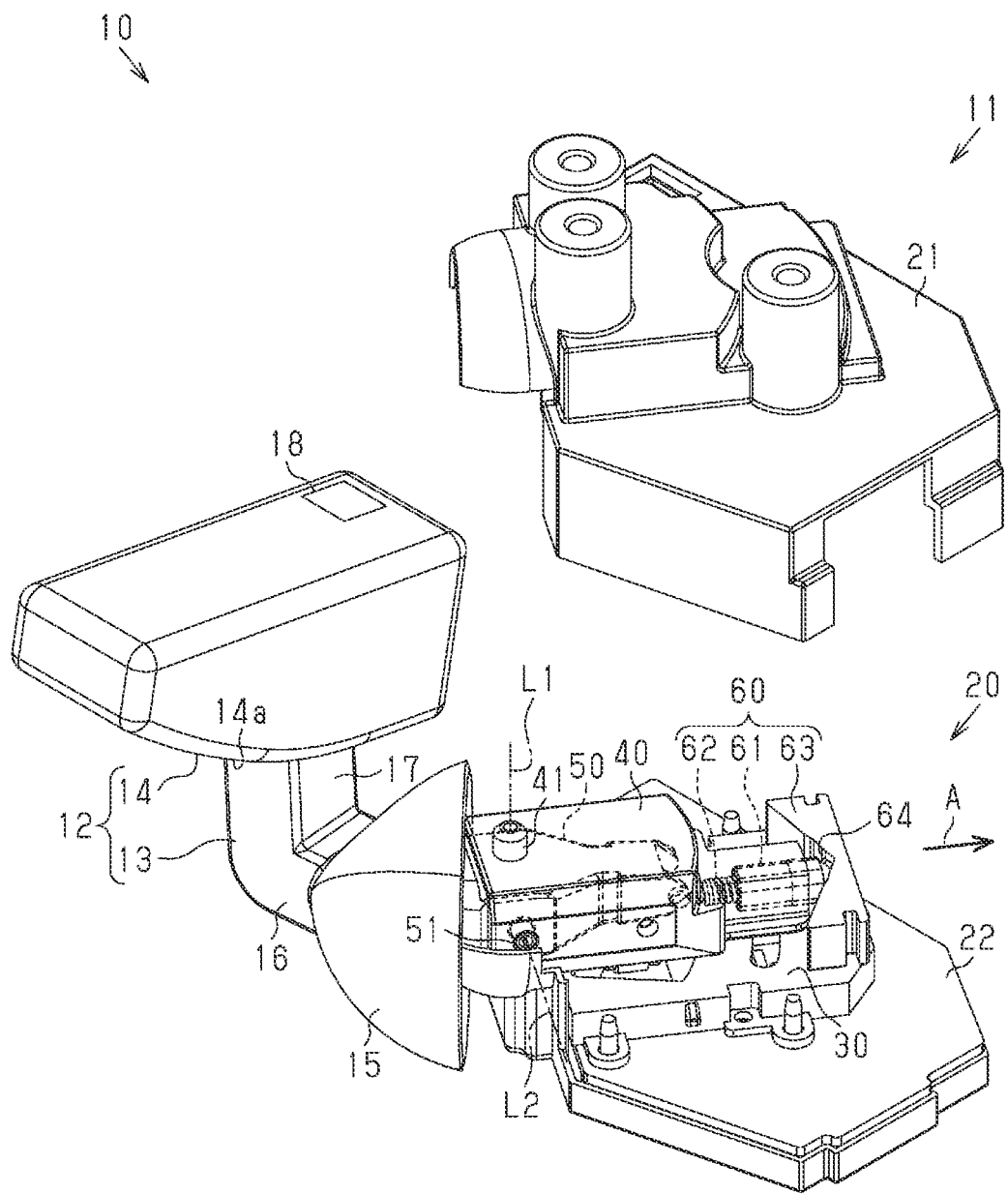
FIG. 5 is an exploded perspective view showing the inner portion of a switch body.

As shown in FIG. 5, the switch body 11 includes an upper case 21 and a lower case 22 that are opposed toward each other in the axial direction of the steering shaft 2. In a state attached to the irregularly-shaped steering unit 1, the upper case 21 is arranged at the front side in the axial direction. The lower case 22 is arranged at the back side in the axial direction. The upper case 21 and the lower case 22 accommodate a switch mechanism 20 that supports the lever unit 12 in a pivotal manner.

Figure 6:
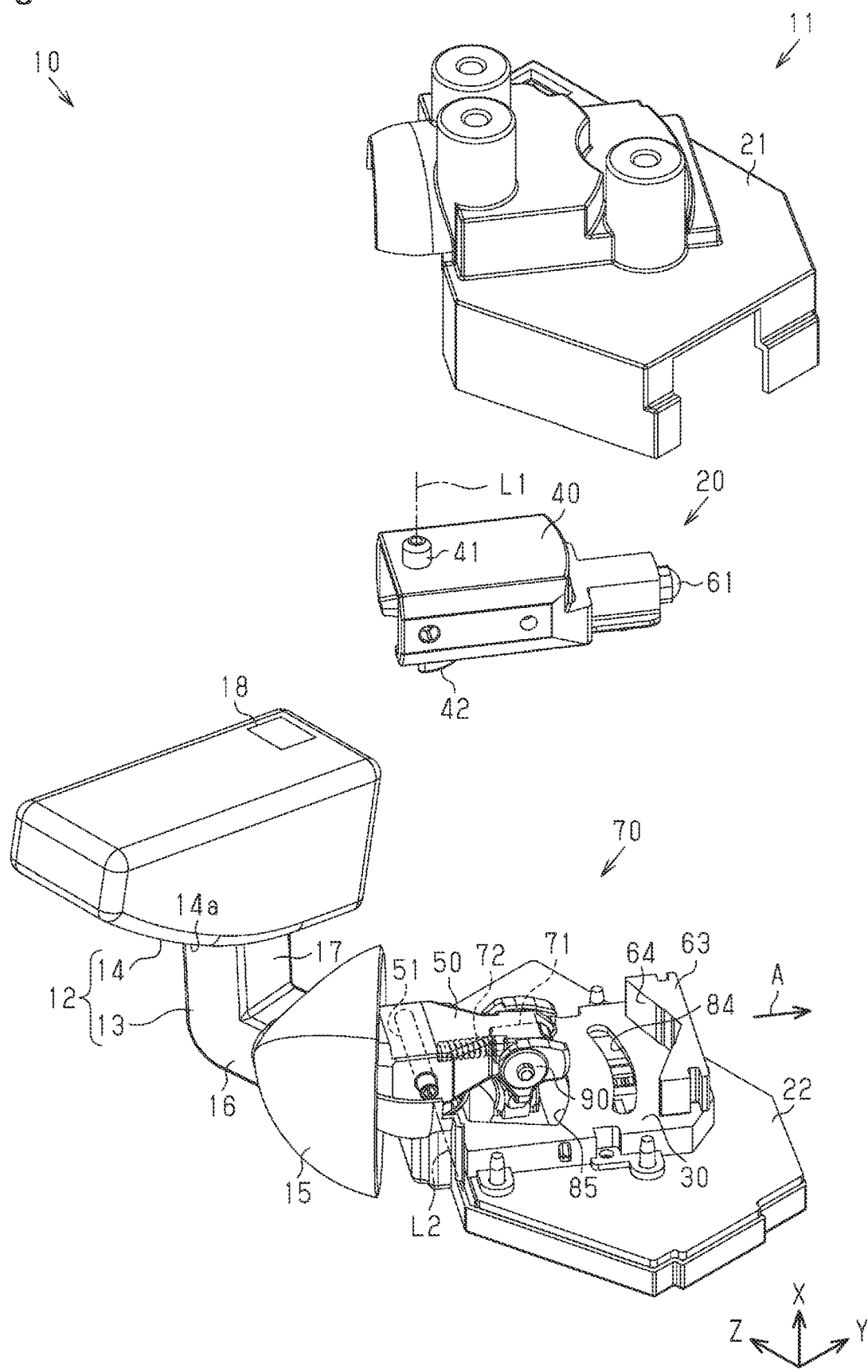
FIG. 6 is an exploded perspective view showing a first pivoting unit and a second pivoting unit.
Figure 7:
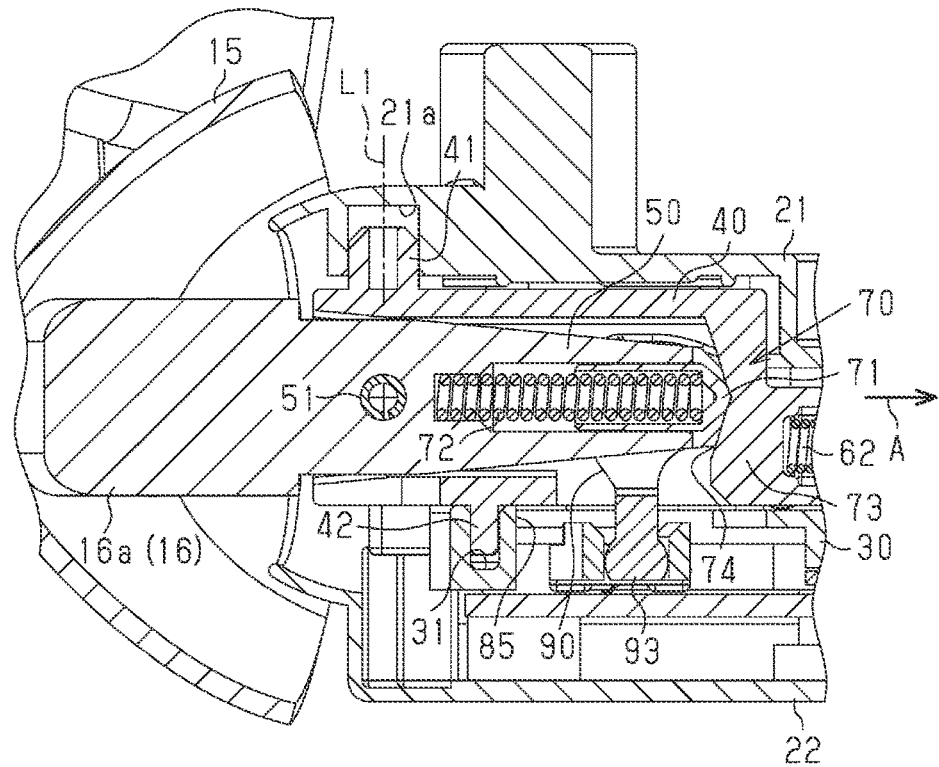
FIG. 7 is a cross-sectional view taken along line VII-VII in FIG. 3.

As shown in FIGS. 5 to 7, the switch mechanism 20 includes a base unit 30 engaged with the lower case 22, a first pivoting unit 40 supported by the upper case 21, and a second pivoting unit 50 pivotally supported about the first pivoting unit 40. The switch mechanism 20 is connected to the lever unit 12 in a connection direction A, and the first pivoting unit 40 and the second pivoting unit 50 are arranged to extend in the connection direction A. In the present embodiment, the connection direction A is orthogonal to the axial direction and extends diagonally relative to the width direction and the height direction. The switch mechanism 20 supports the lever unit 12 pivotally about two directions that are orthogonal to the connection direction A.

The first pivoting unit 40 includes a projection 41 projecting toward the upper case 21. The upper case 21 includes a fitting hole 21*a* into which the projection 41 is inserted. The first pivoting unit 40 and the second pivoting unit 50 are supported by the upper case 21 pivotally about a first axis L1 by fitting the projection 41 to the fitting hole 21*a*. The first axis L1 extends in the axial direction of the steering shaft 2.

Figure 8:
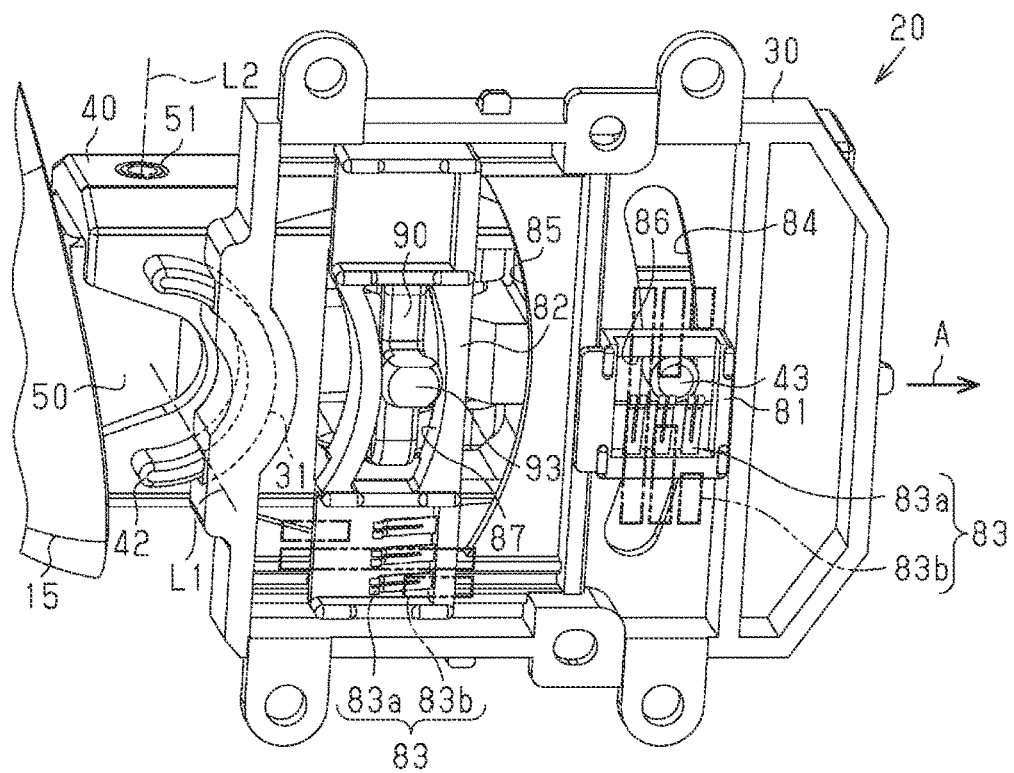
FIG. 8 is a perspective view showing a rear side of a base unit.

As shown in FIGS. 7 and 8, the first pivoting unit 40 includes an engaging wall 42 projecting toward the base unit 30. The base unit 30 includes an engaging groove 31 into which the engaging wall 42 is fitted. The engaging wall 42 and the engaging groove 31 are arcuate and extend about the first axis L1. The engaging groove 31 is fitted to the engaging wall 42 to pivotally guide the first pivoting unit 40 about the first axis L1. The engaging wall 42 slides in the engaging groove 31 when the first pivoting unit 40 is pivoted.

As shown in FIGS. 5 and 6, the second pivoting unit 50 is fitted into and coupled to the first pivoting unit 40. The proximal side of the second pivoting unit 50 is connected to the base 16 of the lever shaft 13 in the connection direction A. In one example, the proximal end of the second pivoting unit 50 is connected to the base 16 of the lever shaft 13. The second pivoting unit 50 includes a through shaft 51 that extends through the first pivoting unit 40 and the second pivoting unit 50. The second pivoting unit 50 is supported by the through shaft 51 pivotally to the first pivoting unit 40. The through shaft 51 is arranged at the proximal side of the second pivoting unit 50 in the connection direction A. In one example, the through shaft 51 extends along a second axis L2 at the proximal end of a second pivoting unit 50. Accordingly, the second pivoting unit 50 is supported by the first pivoting unit 40 pivotally about the second axis L2. The second axis L2 is orthogonal to the first axis L1.

As described above, the lever unit 12 is supported on the switch body 11 pivotally about the first axis L1 and the second axis L2 by the first pivoting unit 40 and the second pivoting unit 50 of the switch mechanism 20. When the lever unit 12 is operated to pivot about the second axis L2, only the second pivoting unit 50 is pivoted and the first pivoting unit 40 is not pivoted. When the lever unit 12 is operated to pivot about the first axis L1, the first pivoting unit 40 and the second pivoting unit 50 are pivoted. The lever head 14 of the lever unit 12 is operated to pivot about the first axis L1 upward or downward in the height direction and is also operated to pivot about the second axis L2 backward or frontward in the axial direction. The pivotal operation about the first axis L1 corresponds to a pivotal operation about the axis of the steering shaft 2, and the pivotal operation about the second axis L2 corresponds to a pivotal operation about a direction that intersects the axis.

Figure 9:
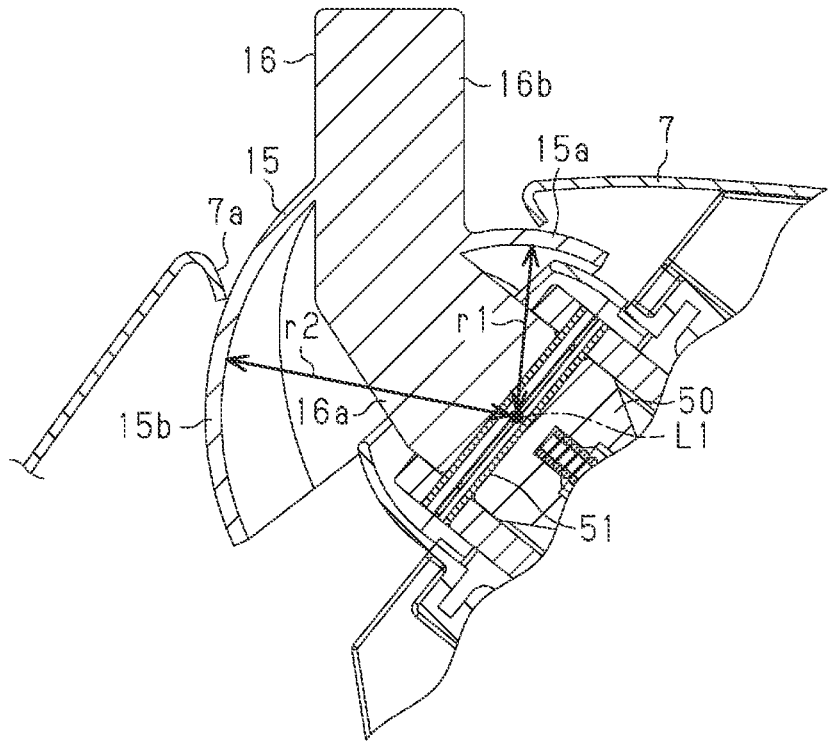
FIG. 9 is a cross-sectional view taken along line IX-IX in FIG. 4.

As shown in FIG. 9, the base 16 of the lever shaft 13 includes a connection portion 16*a* connected to the second pivoting unit 50 and a projection portion 16*b* projecting from the connection portion 16*a* out of the back cover 7. The connection portion 16*a* extends in the connection direction A along the second pivoting unit 50. The projection portion 16*b* extends upward in the height direction. In this manner, the base 16 is arranged to extend in the connection direction A and bent in the height direction. The projection portion 16*b* extends through the insertion hole 7*a* of the back cover 7 and projects out of the back cover 7.

In a cross-sectional view taken along a line orthogonal to the axial direction, the guard 15 arranged around the base 16 includes a first arcuate portion 15*a*, which has radius r1 and extends about the first axis L1, and a second arcuate portion 15*b*, which has radius r2 and extends about the first axis L1. In this manner, the guard 15 is arranged in a stepped manner at different positions on the base 16. The first arcuate portion 15*a* and the second arcuate portion 15*b* are arcuate and extend about the first axis L1 so that the gap between the back cover 7 and the guard 15 does not increase when the lever unit 12 is pivoted about the first axis L1.

As shown in FIGS. 2 to 4, the guard 15 is curved between the first arcuate portion 15*a* and the second arcuate portion 15*b*. The guard 15 is umbrella-shaped in its entirety. The umbrella-shaped portion of the guard 15 has a greater diameter than the insertion hole 7*a* of the back cover 7. In this manner, the guard 15 closes the gap in the insertion hole 7*a* and conceals the switch body 11 in the back cover 7.

As shown in FIG. 5, the switch mechanism 20 includes a detent mechanism 60 at the distal side of the first pivoting unit 40 in the connection direction A. The detent mechanism 60 produces clicks when the lever unit 12 is operated. In one example, the detent mechanism 60 is arranged at the distal end of the first pivoting unit 40. The detent mechanism 60 includes an abutment portion 61 that projects out of the distal end of the first pivoting unit 40 and an urging member 62 that urges the abutment portion 61 toward the distal side in the connection direction A. The detent mechanism 60 also includes an opposing wall 63 arranged on the base unit 30 and opposed toward the abutment portion 61. The surface of the opposing wall 63 opposed toward the abutment portion 61 is inclined and recessed in the connection direction A of the first pivoting unit 40 and defines an inclined surface 64. The inclined surface 64 is inclined to form a substantially triangular shape. The detent mechanism 60 produces clicks when the lever unit 12 is operated about the first axis L1.

As shown in FIGS. 6 and 7, the switch mechanism 20 includes a detent mechanism 70 at the distal side of the second pivoting unit 50 in the connection direction A. The detent mechanism 70 produces clicks when the lever unit 12 is operated. In one example, the detent mechanism 70 is arranged at the distal end of the second pivoting unit 50. The detent mechanism 70 includes an abutment portion 71 that is arranged at the distal end of the second pivoting unit 50 and an urging member 72 that urges the abutment portion 71 toward the distal side in the connection direction A. The detent mechanism 70 also includes an opposing wall 73 arranged inside the base unit 40 and opposed toward the abutment portion 71. The surface of the opposing wall 73 opposed toward the abutment portion 71 defines an inclined surface 74 inclined in a direction orthogonal to the inclined surface 64 of the detent mechanism 60. The detent mechanism 70 produces clicks when the lever unit 12 is operated about the second axis L2.

The movement of the detent mechanisms 60, 70 when the lever unit 12 is operated about the first axis L1 will now be described. The detent mechanisms 60, 70 are moved based on the same principle. Thus, movement of the detent mechanism 70 when the lever unit 12 is operated about the second axis L2 will not be described.

Figure 10A:
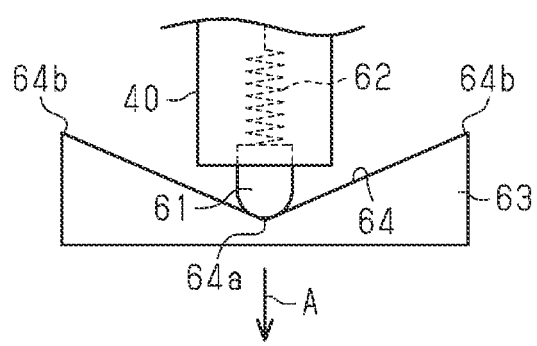
FIG. 10A is a schematic diagram illustrating the movement of a detent mechanism.

As shown in FIG. 10A, a central portion 64a of the inclined surface 64 in a direction orthogonal to the connection direction A is located toward the distal side in the connection direction A from end portions 64b of the inclined surface 64 in the orthogonal direction. When the first pivoting unit 40 is located at an initial position prior to pivoting, the abutment portion 61 is pressed toward the distal side in the connection direction A against the central portion 64a of the inclined surface 64. This holds the first pivoting unit 40 at the initial position on the base unit 30.

Figure 10B:
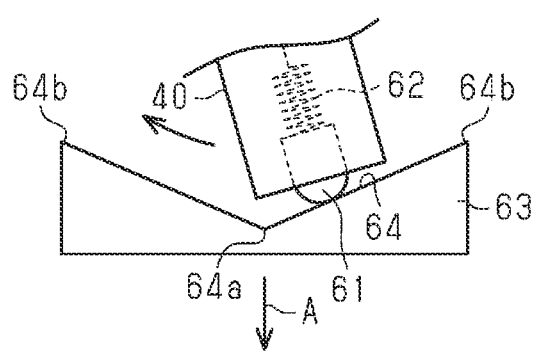
FIG. 10B is a schematic diagram illustrating the movement of the detent mechanism.

As shown in FIG. 10B, when the lever unit 12 is operated and pivoted about the first axis L1, the abutment portion 61 slides on the inclined surface 64 and moves from the position on the central portion 64a to a position located toward an end portion 64b of the inclined surface 64. In this case, the abutment portion 61 is pressed by the inclined surface 64 toward the proximal side in the connection direction A and is moved toward the proximal side of the first pivoting unit 40 against the urging force of the urging member 62. The urging force of the urging member 62 allows the first pivoting unit 40 to produce a click perceived by the user who is operating the lever unit 12.

When the lever unit 12 is no longer operated, the urging force of the urging member 62 forces the abutment portion 61 to slide from near the end portion 64b of the inclined surface 64 toward the central portion 64a. This returns the lever unit 12 to the initial position together with the first pivoting unit 40. That is, the lever unit 12 is of a momentary type in which the detent mechanism 60 return the lever unit 12 to the initial position. The lever unit 12 may be of a stationary type in which the detent mechanism 60 holds the lever unit 12 at a predetermined position.

Figure 11:
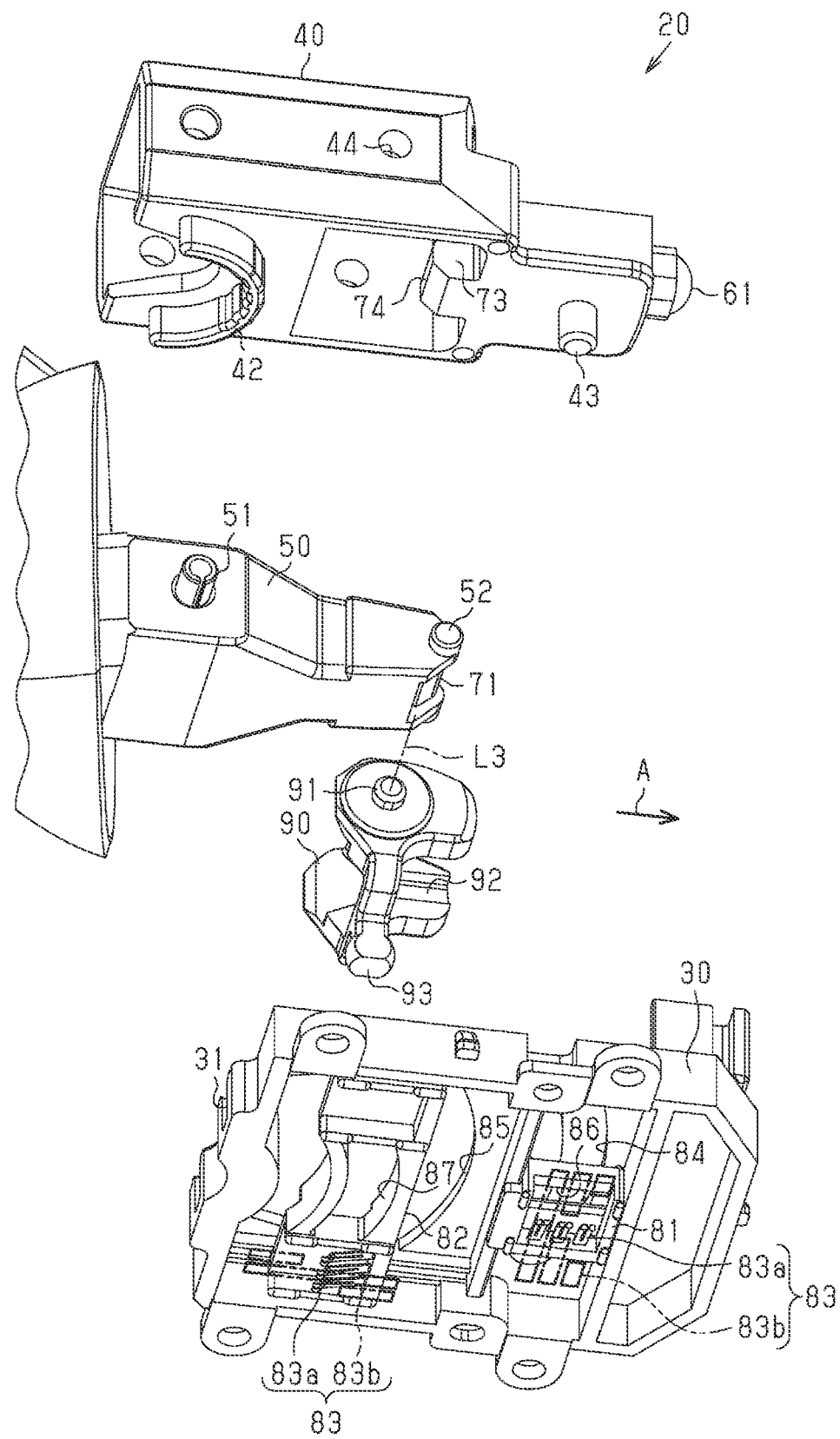
FIG. 11 is an exploded perspective view showing a back surface of a switch mechanism.

As shown in FIGS. 8 and 11, the base unit 30 includes a first slider 81 that is moved when the first pivoting unit 40 is moved and a second slider 82 that is moved when the second pivoting unit 50 is moved. The first slider 81 and the second slider 82 each include a slide contact point 83. The slide contact points 83 are formed on a substrate (not shown) arranged between, for example, the base unit 30 and the lower case 22. The slide contact points 83 each include sets of a movable contact point 83a and a fixed contact point 83b. When the first slider 81 and the second slider 82 slide and move, the movable contact point 83a and the fixed contact point 83b of each set move toward or away from each other to switch the movable contact point 83a and the fixed contact point 83b between an open state or a closed state.

The switch mechanism 20 switches functionalities by switching the slide contact points 83 between an open state and a closed state.

The base unit 30 includes an opening 84 opposed toward the first slider 81 and an opening 85 opposed toward the second slider 82. The opening 84 extends in a circumferential direction about the first axis L1. The opening 85 extends in the connection direction A and widens in the circumferential direction about the first axis L1.

The first slider 81 includes a through-hole 86 that extends through the first slider 81 and extends in the connection direction A. The first pivoting unit 40 includes a rod 43 inserted into the through-hole 86 through the opening 84. The rod 43 is integrated with the distal side of the first pivoting unit 40 in the connection direction A. The first slider 81 is pressed by the rod 43 to slide when the first pivoting unit 40 is pivoted about the first axis L1.

A pivoting piece 90 that moves in cooperation with the second pivoting unit 50 is arranged between the second pivoting unit 50 and the base unit 30. The pivoting piece 90 includes projections 91 fitted into fitting holes 44 of the first pivoting unit 40. The projections 91 fitted to the fitting holes 44 support the first pivoting unit 40 pivotally about a third axis L3. The third axis L3 extends parallel to the second axis L2.

The pivoting piece 90 includes engaging recesses 92 engaged with the second pivoting unit 50. The distal end of the second pivoting unit 50 in the connection direction A includes engaging projections 52 fitted into the engaging recesses 92. When the second pivoting unit 50 is pivoted about the second axis L2, the engaging recesses 92 are pushed by the engaging projections 52 so that the pivoting piece 90 is pivoted about the third axis L3. In this case, the pivot angle of the pivoting piece 90 about the third axis L3 is greater than the pivot angle of the second pivoting unit 50 about the second axis L2. That is, pivoting of the pivoting piece 90 is greater than the second pivoting unit 50.

The second slider 82 includes a through-hole 87 that extends through the second slider 82 and extends in an arcuate manner in a circumferential direction about the first axis L1. The pivoting piece 90 includes a rod 93 inserted into the through-hole 87 through the opening 85. The second slider 82 is pressed by the rod 93 to slide when the pivoting piece 90 is pivoted about the third axis L3

The action of the first slider 81 and the second slider 82 will now be described.

Figure 12:
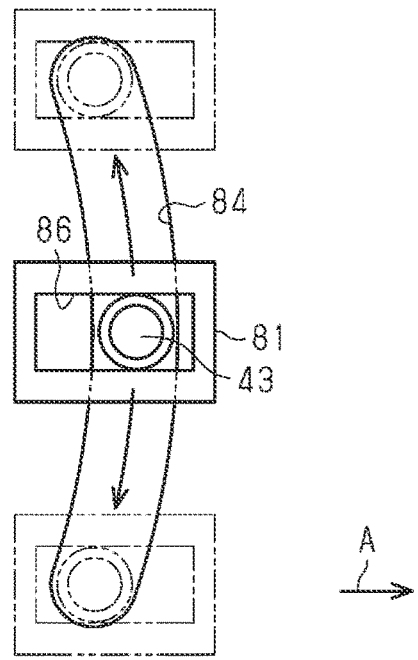
FIG. 12 is a schematic diagram showing actions of a first slider.

As shown in FIG. 12, when the first pivoting unit 40 is pivoted about the first axis L1, the rod 43 of the first pivoting unit 40 moves inside the opening 84 in an arcuate manner in the circumferential direction about the first axis L1. The first slider 81 linearly slides in accordance with the movement of the rod 43. The sliding direction of the first slider 81 is orthogonal to the connection direction A.

Figure 13:
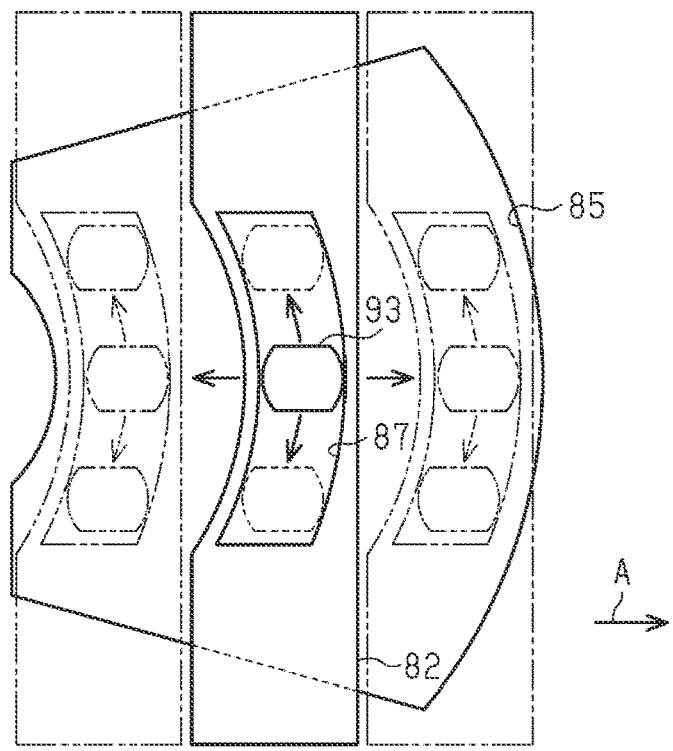
FIG. 13 is a schematic diagram showing actions of a second slider.

As shown in FIG. 13, when the pivoting piece 90 is pivoted about the third axis L3, the rod 93 of the pivoting piece 90 moves inside the opening 85 in the connection direction A. That is, when the second pivoting unit 50 is pivoted about the second axis L2, the second slider 82 slides in the connection direction A in accordance with the movement of the rod 93.

In the second slider 82, the through-hole 87 extending in the circumferential direction about the first axis L1 swings the rod 93 about the first axis L1. That is, when the lever unit 12 is operated and pivoted about the first axis L1, the pivoting piece 90 is pivoted about the first axis L1 together with the first pivoting unit 40. However, the second slider 82 remains in place. Even in a state after the second slider 82 slides in the connection direction A, the rod 93 will be swung in the circumferential direction about the first axis L1. Further, when the rod 93 is pivoted about the first axis L1 and then pivoted about the third axis L3, pivoting of rod 93 will move the second slider 82.

As described above, the first slider 81 and the second slider 82 slide in accordance with the operation direction of the lever unit 12, which is operated and pivoted to switch the slide contact points 83 between an open state and a closed state. This switches functionalities in accordance with the operation directions of the lever unit 12.

The operation of the present embodiment will now be described.

Figure 14A:
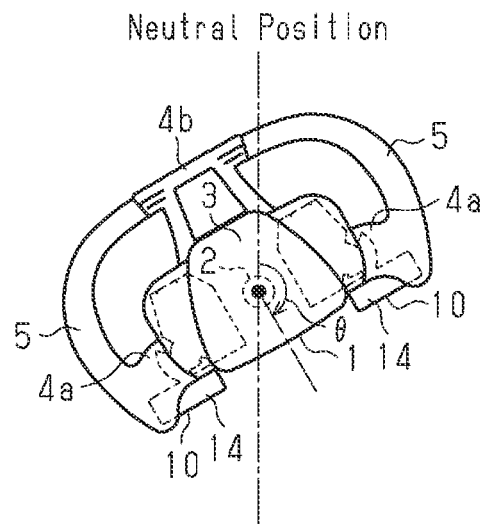
FIG. 14A is a diagram showing a right turning operation of the irregularly-shaped steering unit.
Figure 14B:
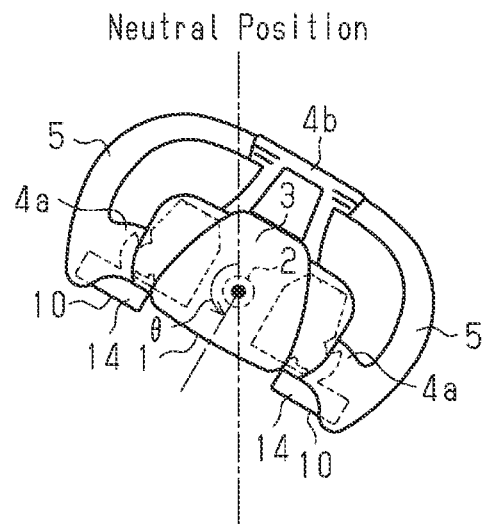
FIG. 14B is a diagram showing a left turning operation of the irregularly-shaped steering unit.

As shown in FIGS. 14A and 14B, the irregularly-shaped steering unit 1 can be turned rightward and leftward from a neutral position. FIG. 14A is a diagram showing the irregularly-shaped steering unit 1 turned rightward from the neutral position, and FIG. 14B is a diagram showing the irregularly-shaped steering unit 1 turned leftward from the neutral position. The irregularly-shaped steering unit 1 of the present embodiment cannot be rotated rightward or leftward from the neutral position a multiple number of full rotations. The irregularly-shaped steering unit 1 has a small rotation angle limit that allows for less than a single rotation in the rightward and leftward directions. Preferably, the maximum rotation angle θ of the irregularly-shaped steering unit 1 is, for example, approximately 150 to 160 degrees.

Figure 15A:
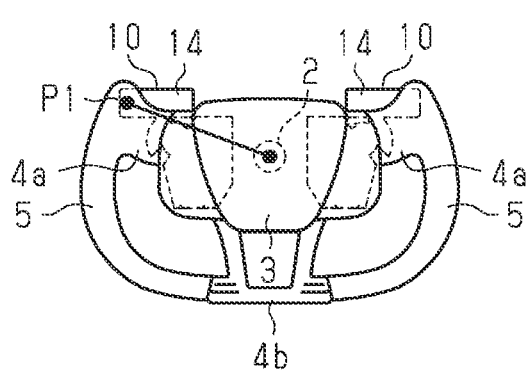
FIG. 15A is a diagram showing an operation of a switch device.
Figure 15B:
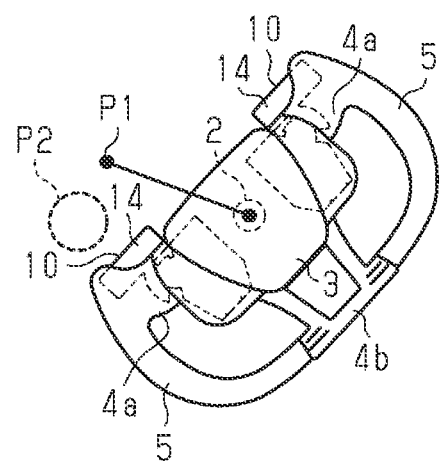
FIG. 15B is a diagram showing an operation of the switch device.

FIG. 15A shows an example in which a separate switch that does not rotate integrally with the irregularly-shaped steering unit 1 is arranged near the irregularly-shaped steering unit 1. In FIG. 15A, the switch that has predetermined switching functionalities is arranged at position P1. In this case, as shown in FIG. 15B, when the irregularly-shaped steering unit 1 is turned left, the switch, which is located at position P1, is separated from the grips 5. When operating the switch at position P1 in this state, the user may extend his or her hand to, for example, area P2, which is in the vicinity of position P1. If the irregularly-shaped steering unit 1 returns to the neutral position when the hand is still held in area P2, the irregularly-shaped steering unit 1 will hit the hand. This will adversely affect the operability of the irregularly-shaped steering unit 1. In this case, the user may need to visually check the positional relationship of the switch at the position P1 and the irregularly-shaped steering unit 1. This may also adversely affect the operability.

In contrast, the switch device 10 according to the present embodiment is attached to the irregularly-shaped steering unit 1 and rotated integrally with the irregularly-shaped steering unit 1. Thus, the positional relationship of the irregularly-shaped steering unit 1 and the switch device 10 is always the same regardless of the position of the irregularly-shaped steering unit 1. This avoids a situation in which a hand or fingers are arranged in the path of the turned irregularly-shaped steering unit 1, and the irregularly-shaped steering unit 1 will not obstruct a switch operation. This also eliminates the necessity for visual checking of the positional relationship of the switch device 10 and the irregularly-shaped steering unit 1 and allows for easy switch operation.

The lever head 14 of the lever unit 12 extends in the width direction, which intersects the axial direction, from the lever shaft 13, which extends in the axial direction. Thus, the lever head 14 includes a wide front surface that is opposed toward the user in the axial direction. This facilitates operation of the lever unit 12. Further, the lever head 14 extends in the width direction that intersects two operation directions, namely, the axial direction and the height direction. This enlarges the area of the surface where the lever head 14 is operated.

The lever head 14 is arranged so as not to extend outward from the grips 5, and the lever head 14 is arranged so as not to project outward in the width direction from the peripheral portion 6, that is, outward in the longitudinal direction. Thus, the lever head 14 does not project outward from the path of the turned irregularly-shaped steering unit 1 in the radial direction of the steering shaft 2. Thus, when rotated together with, for example, the irregularly-shaped steering unit 1, the lever head 14 is less likely to hit a leg or the like of the user beneath the irregularly-shaped steering unit 1. This reduces erroneous operations that are not intended by the user.

The lever head 14 includes a projecting portion that projects outward in the height direction from the upper portion of the peripheral portion 6. The projecting portion includes the display 18 exposed to the front side of the irregularly-shaped steering unit 1. This allows the irregularly-shaped steering unit 1 to display information to the user in a preferred manner.

The advantages of the present embodiment will now be described.

(1) The switch device 10 includes the switch body 11, which is attached to and rotated integrally with the irregularly-shaped steering unit 1, and the lever unit 12, which is held pivotally about the switch body 11. The lever unit 12 includes the lever shaft 13 including the base 16, which extends in a direction intersecting the steering shaft 2, and the arm 17, which is formed integrally with the base 16 and extends in a direction that differs from the direction in which the base 16 extends. The lever unit 12 also includes the lever head 14 at the distal end of the lever shaft 13, and the lever head 14 extends from the lever shaft 13 in the width direction, which intersects the axial direction. With this structure, the lever unit 12 rotates integrally with the irregularly-shaped steering unit 1. Thus, the user does not have to release his or her hand from the irregularly-shaped steering unit 1 or perform an operation in an open space. This improves operability. Further, the lever head 14 arranged on the lever shaft 13 is T-shaped. Thus, the lever head 14 includes a wide surface that is opposed toward the user who is seated frontward in the axial direction from the lever head 14. This further facilitates operation.

(2) The arm 17 of the lever shaft 13 extends from the back side toward the front side of the irregularly-shaped steering unit 1. The lever head 14 is arranged at the back side of the irregularly-shaped steering unit 1. With this structure, the lever head 14 is arranged close to the grips 5 of the irregularly-shaped steering unit 1 in the axial direction. This improves operability.

(3) The lever unit 12 does not to extend out of the grip 5 of the irregularly-shaped steering unit 1. With this structure, the lever unit 12 does not project outward from the path of the grips 5 when the irregularly-shaped steering unit 1 is turned. This reduces erroneous operations that are not intended by the user when the lever unit 12 is rotated together with the irregularly-shaped steering unit 1.

(4) The irregularly-shaped steering unit 1, when viewed from the front at the neutral rotation position, is smaller in the height direction than in the width direction. The lever unit 12 projects outward in the height direction from the contour of the irregularly-shaped steering unit 1 in a front view. With this structure, the lever unit 12 is easily viewed from the front. Further, since the lever unit 12 projects in the height direction, which corresponds to the transverse direction of the irregularly-shaped steering unit 1, the amount of the projection is set so as not to project outward from the path of the turned irregularly-shaped steering unit 1. That is, the lever unit 12 is arranged at a position where its front side can be easily viewed. This allows for easy steering.

(5) The lever unit 12 is supported pivotally about the first axis L1 and the second axis L2 so that the lever unit 12 is operated to pivot about the axis of the steering shaft 2 and a direction intersecting the axis. The lever head 14 extends in the width direction of the irregularly-shaped steering unit 1. With this structure, the lever head 14 is allowed to be shaped to extend in the direction that intersects the two operation directions of the lever head 14, which is operated up and down in the vertical direction about the axis and operated back and forth in the axial direction about the direction intersecting the axis. This increases the area of the operated surface of the lever head 14 and improves operability.

(6) The lever head 14 includes the display 18 that displays the switching functionality assigned to the lever unit 12. With this structure, the switching functionality of the lever unit 12 is shown to the user. Further, the display 18 arranged at the portion of the lever head 14 exposed to the front side displays information to the user in a preferred manner.

The present embodiment may be modified as follows. The present embodiment and the following modifications can be combined as long as the combined modifications are not in contradiction.

Switch Body 11

Figure 16A:
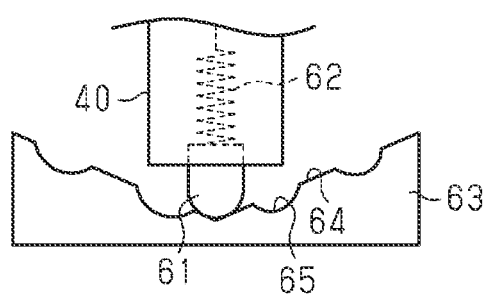
FIG. 16A is a schematic diagram illustrating the movement of the detent mechanism according to another embodiment.
Figure 16B:
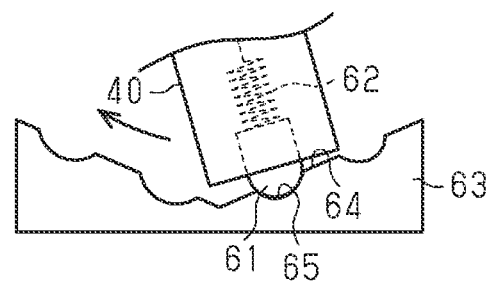
FIG. 16B is a schematic diagram illustrating the movement of the detent mechanism according to another embodiment.

As shown in FIGS. 16A and 16B, the inclined surface 64 of the detent mechanism 60 may include a recess 65 that holds the lever unit 12 at a predetermined operation angle. The abutment portion 61 when pivoted is fitted into and held in one of the recesses 65 by the urging force of the urging member 62. This holds the lever unit 12 at a predetermined operation angle. Further, when the lever unit 12 is operated against the urging force of the urging member 62 in a state where the abutment portion 61 is fitted into the recess 65, the abutment portion 61 is moved out of the recess 65 to allow the lever unit 12 to be pivoted. That is, the lever unit 12 may be of a stationary type. One or both of the detent mechanism 60 and the detent mechanism 70 may include the recesses 65. The mechanism that holds the lever unit 12 as in a stationary type may be arranged on a member that is separate from the detent mechanisms 60, 70.

The detent mechanisms 60, 70 are not limited to the present embodiment. For example, detent mechanisms 60, 70 may be arranged on a member that is separate from the first pivoting unit 40 and the second pivoting unit 50.

The switch body 11 does not need to be covered by the back cover 7 of the irregularly-shaped steering unit 1. Instead, the switch body 11 may be covered by, for example, a cover member of the vehicle. Alternatively, the switch body 11 may form part of a shell of the back side of the irregularly-shaped steering unit 1. The upper case 21 and the lower case 22 may be arranged to cover the guard 15 while forming part of the shell of the back side of the irregularly-shaped steering unit 1.

Lever Unit 12

The lever head 14 does not need to be shaped as in the present embodiment. For example, the back surface 14a does not need to be arranged diagonally relative to the axial direction. However, the lever head 14, which is narrowed in the axial direction at the outer side in the width direction, is advantageous in that the lever head 14 when rotated is less likely to hit a leg or the like of the user.

The lever head 14 may include a switching functionality such as a push button that is operated differently from a pivotal operation.

The lever head 14 may include multiple displays 18. For example, the lever head 14 may include one, two, three, or more multiple displays 18. The display 18 does not need to be exposed to the front side. The display 18 does not need to be arranged on the front surface of the lever head 14. The display 18 may be arranged on the top surface or any other surface.

The display 18 of the lever head 14 may be omitted.

The lever head 14 may extend in the same direction as the operation directions for the lever unit 12 such as the axial direction or the height direction. That is, the lever head 14 may be formed to be larger than the diameter of the arm 17. The diameter of the arm 17 is, for example, the dimension of the arm 17 in the direction that intersects the direction in which the arm 17 extends.

The lever shaft 13 does not need to extend from the back side toward the front side in the axial direction. Instead, the lever shaft 13 may extend from the front side toward the back side.

The lever shaft 13 does not need to be bent. The lever shaft 13 may have any other shape.

The lever unit 12 does not need to be arranged at the back side of the irregularly-shaped steering unit 1. Instead, the lever unit 12 may be arranged at any other location such as on a side surface or a front surface.

The lever unit 12 may project in the longitudinal direction of the irregularly-shaped steering unit 1 when the irregularly-shaped steering unit 1 in a front view.

The lever unit 12 may be arranged at any position in the circumferential direction about the irregularly-shaped steering unit 1.

Irregularly-Shaped Steering Unit 1

The irregularly-shaped steering unit 1 does not have to be shaped with the grips 5 arranged at the sides and connected by the spoke 4b. Instead, the irregularly-shaped steering unit 1 may be changed to include, for example, only the grips 5 at the sides.

The irregularly-shaped steering unit 1 may be turned a multiple number of full rotations.

The irregularly-shaped steering unit 1 may have any shape other than a circle.

The irregularly-shaped steering unit 1 may be asymmetrical.

Others

The various types of switching functionalities of the switch device 10 may include functionalities other than those described in the embodiment.

Switching of various types of switching functionalities does not need to performed by a sliding contact point mechanism. Instead, various types of switches such as a tactile switch and a toggle switch may be used. The various types of switches may include sensors.

The irregularly-shaped steering unit 1 does not need to include two switch devices 10. Instead, the irregularly-shaped steering unit 1 may include, for example, one switch device 10 or three or more switch devices 10.

The switch device 10 may be arranged at only one side of the irregularly-shaped steering unit 1. That is, the switch devices 10 do not need to be arranged in a symmetrical manner.

The present disclosure includes the following implementation example. Reference numerals are assigned to some of the components in the example embodiment in order to facilitate understanding without limiting the scope of the present disclosure. The elements described in the following implementation example may be partly omitted, selected, or used in combination.

A vehicle steering device (1, 2) according to one or more implementation examples of the present disclosure includes,
- an irregularly-shaped steering unit (1);
- a steering shaft (2) attached to a rotational center of the irregularly-shaped steering unit (1);
- a back cover (7) attached to a back surface of the irregularly-shaped steering unit (1) and partially accommodating the steering shaft (2); and
- a lever-type switch device (10) including multiple switching functionalities, where the switch device (10) includes
  - a switch body (11) accommodated in the back cover (7) and attached to and rotated integrally with the irregularly-shaped steering unit (1), and
  - a lever unit (12) held pivotally about the switch body (11), where the lever unit (12) includes
    - a lever shaft (13) including a base (16) that extends from the back cover (7) in a direction intersecting a rotary shaft (2) of the irregularly-shaped steering unit (1) and an arm (17) that is formed integrally with the base (16) and extended in a direction that differs from the direction in which the base (16) extends, and
    - a lever head (14) arranged at the distal end of the arm (17) of the lever shaft (13) and having a larger dimension than a diameter of the arm (17).

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A lever-type switch device including multiple switching functionalities for operating multiple vehicle on-board devices, the switch device comprising:
   - a switch body arranged on an irregularly-shaped steering unit, wherein the irregularly-shaped steering unit is rotated to steer a vehicle, and the switch body is attached to and rotated integrally with the irregularly-shaped steering unit; and
   - a lever unit held pivotally about the switch body, wherein the lever unit includes
     - a lever shaft including a base that extends in a direction intersecting a rotary shaft of the irregularly-shaped steering unit and an arm that is formed integrally with the base and extends in a direction differing from the direction in which the base extends, and
     - a lever head arranged on a distal end of the lever shaft, wherein the lever head has a dimension that is larger than a diameter of the arm.

2. The switch device according to claim 1, wherein
   the arm extends from a back side toward a front side of the irregularly-shaped steering unit, and
   the lever head is arranged at the back side of the irregularly-shaped steering unit.

3. The switch device according to claim 1, wherein the lever unit does not extend outward from a grip of the irregularly-shaped steering unit.

4. The switch device according to claim 1, wherein
   the irregularly-shaped steering unit has a dimension in a width direction that is greater than a dimension in a direction orthogonal to the width direction in a front view taken at a neutral position, and
   the lever unit projects outward in the direction orthogonal to the width direction from a contour of the irregularly-shaped steering unit in the front view.

5. The switch device according to claim 4, wherein
   the lever unit is pivotal about an axis of the steering shaft and a direction intersecting the axis, and
   the lever head extends in the width direction of the irregularly-shaped steering unit.

6. The switch device according to claim 1, wherein the lever head includes a display that displays the switching functionalities assigned to the lever unit.

* * * * *